United States Patent [19]

Schrom et al.

[11] Patent Number: 4,672,730

[45] Date of Patent: Jun. 16, 1987

[54] MOUNTING AID AND METHOD FOR ASSEMBLING A REAR BENCH SEAT OF A MOTOR VEHICLE

[75] Inventors: Ralf-Henning Schrom, Rüsselsheim; Walter P. Trutter, Wiesbaden, both of Fed. Rep. of Germany

[73] Assignee: General Motors Corporation, Detroit, Mich.

[21] Appl. No.: 882,790

[22] Filed: Jul. 7, 1986

[30] Foreign Application Priority Data

Sep. 27, 1985 [DE] Fed. Rep. of Germany ....... 3534432

[51] Int. Cl.⁴ .................. B23P 19/04; B60R 22/00
[52] U.S. Cl. ............................. 29/241; 29/433; 280/801
[58] Field of Search .............. 29/433, 423, 241, 450, 29/235; 280/801–808

[56] References Cited

U.S. PATENT DOCUMENTS

| 2,394,884 | 2/1946 | Adrias | 29/241 |
| 3,555,674 | 1/1971 | Aileo et al. | 29/241 |
| 4,264,254 | 4/1981 | Chang | 29/241 |

Primary Examiner—Howard N. Goldberg
Assistant Examiner—S. Nichols
Attorney, Agent, or Firm—Charles E. Leahy

[57] ABSTRACT

Before mounting a rear seat of a motor vehicle, a wedge-shaped mounting aid is placed on two adjacent belt buckles. The mounting aid engages with its tongues in the belt buckles and is therefore held in the same manner as the belt tongues of the usual safety belts. Since the mounting aid tapers toward the seat, it slips, together with the belt buckles, easily through the slit provided for this purpose in the seat.

8 Claims, 2 Drawing Figures

MOUNTING AID AND METHOD FOR ASSEMBLING A REAR BENCH SEAT OF A MOTOR VEHICLE

The present invention pertains to a process for mounting a rear seat of a motor vehicle, which said seat is equipped with slots for passing through belt buckles. The present invention also pertains to a mounting aid for carrying out the process.

BACKGROUND OF THE INVENTION

Having a steep belt angle is desirable for safety reasons even for the safety belts of the rear seats in modern motor vehicles. To achieve this, the belt buckles must exit from slots in the seat in front of the rear edge of the seat. The belt buckles have been passed through hitherto by hand without a mounting aid, which is a very laborious and time-consuming operation, especially if the belt buckles are fastened to semi-rigid wire cable holders, which yield on pressure on the belt buckles.

SUMMARY OF THE INVENTION

The present invention has the basic task of improving a process of the type mentioned in the introduction so that the mounting of the seat is not rendered difficult and slowed down due to the time-consuming operations involved in passing through the belt buckles. Furthermore, a mounting aid is to be created to carry out the process.

The first-named task is accomplished according to the present invention so that a mounting aid tapering in the shape of a wedge toward the seat is placed on the belt buckles.

The mounting of the seat is essentially facilitated by this procedure and can therefore be carried out in a shorter time than before. The belt buckles do not need to be guided through the corresponding slots any more, and due to the wedge-shaped mounting aids, they slip through the seat by themselves while the seat is being moved downward.

In the ordinary motor vehicles approved for five people, a single belt buckle normally emerges from the seat for a person sitting on one side, and two more belt buckles immediately emerge adjacent to one another for another person sitting on the side and for a person sitting in the middle. Passing the two belt buckles located immediately adjacent to each other through a common slot has been particularly difficult so far. This operation can be made considerably easier if a common mounting aid, which is to be inserted with one tongue into each of the belt buckles, is used according to an advantageous further improvement of the process for two immediately adjacent belt buckles.

The second task, i.e., the creation of a mounting aid for carrying out the above-mentioned process, is accomplished according to the present invention in such a way that the mounting aid consists of a wedge tapering toward the seat, which said wedge has—on its thicker end—a tongue corresponding to a usual buckle tongue for engaging a belt buckle.

Such mounting aids can be simply inserted into the corresponding belt buckles prior to the mounting of the seat bank. They are locked in the same way as the belt tongues and can be removed after the mounting of the seat by depressing the release buttons in the belt buckles. Thanks to these mounting aids according to the present invention, the belt buckles slip through slits in the seat by themselves if they are moved toward the vehicle chassis during mounting.

The slits in the seat usually extend in the transverse direction of the vehicle, while the belt buckles have a principal extension plane in the longitudinal direction of the vehicle. Passing through by means of the mounting aid according to the present invention is very simple even in the case of such slits extended in the transverse direction, if the vertex line of the mounting aid is at right angles to the principal extension plane of the tongue according to an advantageous embodiment of the present invention.

Two belt buckles arranged next to each other can easily be passed through a slit in the seat simultaneously if the mounting aid has two tongues parallel to each other for engaging in two belt buckles provided next to each other. Instead of such a mounting aid for two belt buckles, it would, of course, also be possible to use two individual mounting aids for one belt buckle each, but this would be more expensive.

If the mounting aid is designed for two belt buckles, the problem arises that the release buttons provided in the belt buckle can no longer be reached or can only be reached with difficulty after insertion into the belt buckles. This problem can easily be solved by designing the mounting aid as a hollow body according to another advantageous embodiment of the present invention, and the mounting aid has at least one hole for inserting a finger.

The release buttons can be reached especially easily if the hole is provided in one of the two wedge surfaces of the mounting aid.

The mounting aid can be used in both possible positions in two belt buckles if a hole is provided in both wedge surfaces.

BRIEF DESCRIPTION OF THE DRAWINGS

The present invention may have numerous embodiments. One of them is shown in the drawing and will be described below to further illustrate its basic principle.

In the drawings.

DESCRIPTION OF THE PREFERRED EMBODIMENT

Figure 1:
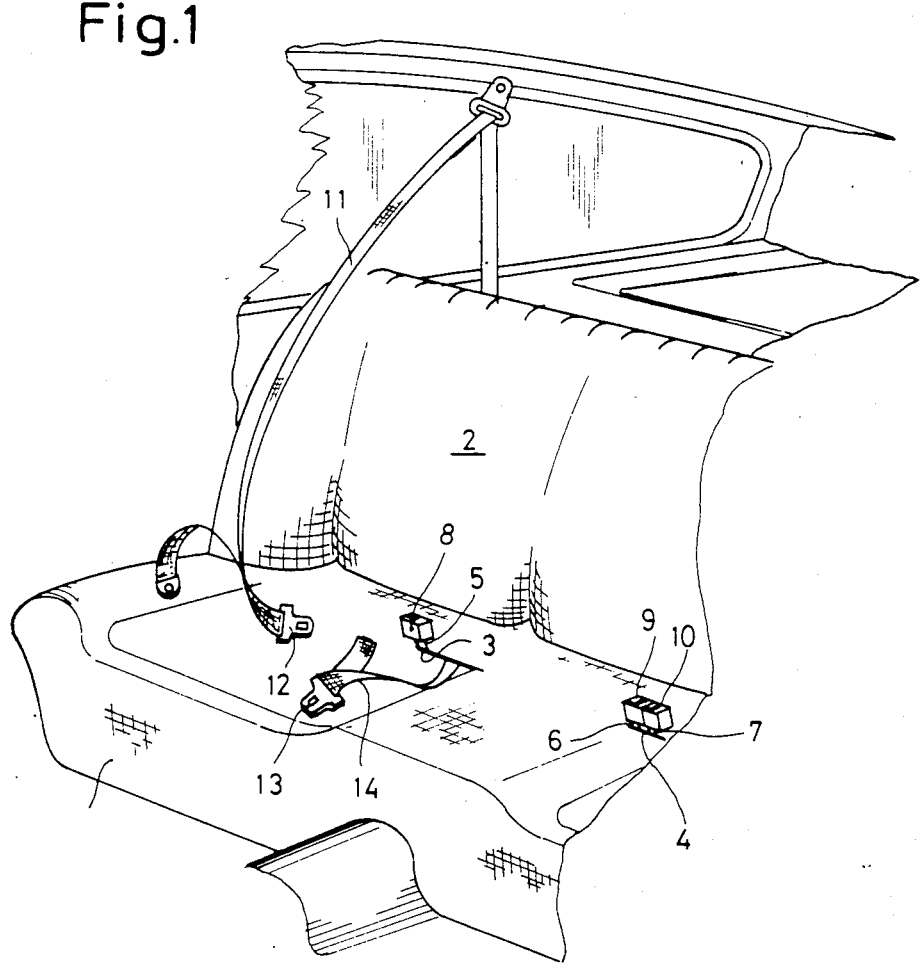
FIG. 1 is a view into the inside of a vehicle with a rear seat, for the mounting of which the process according to the present invention and the mounting aid according to the present invention can be used.

FIG. 1 shows the right-hand area of a rear seat in a passenger car, which consists of a seat 1 and a rear seat backrest 2. Two slits 3 and 4 can be recognized in the seat 1, and the belt holders 5, 6, 7 with the belt buckles 8, 9 and 10 emerge from the slits. A safety belt 11 is shown on the right-hand side of the vehicle and has a belt tongue 12, which can be inserted into the belt buckle 8. A corresponding safety belt (not shown) on the left-hand side of the vehicle is able to be engaged with its belt tongue in the belt buckle 10. The belt buckle 9, which is located immediately adjacent to the belt buckle 10, serves to receive a belt tongue 13 of a lap belt 14, which can be used by a person sitting in the middle of the seat 1.

Figure 2:
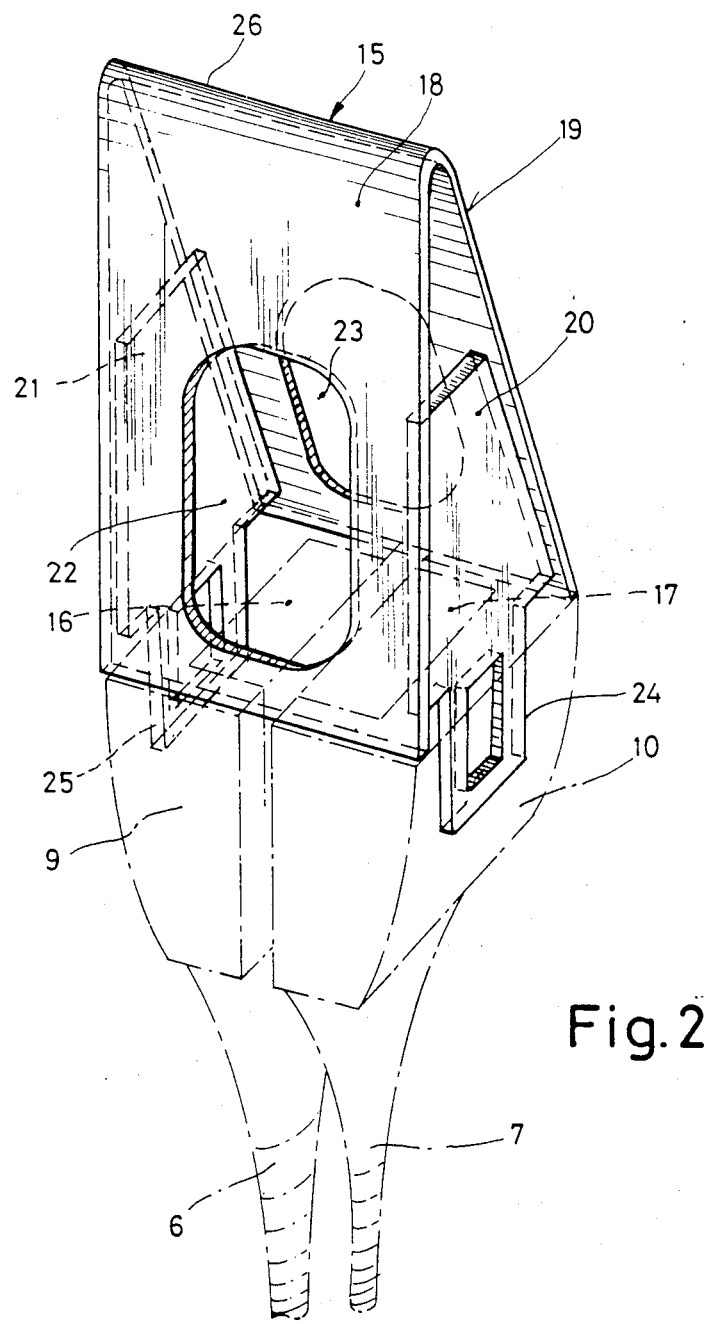
FIG. 2 is a perspective view of two belt buckles located adjacent to each other with the mounting aid according to the present invention.

During the mounting of such a seat 1, a mounting aid 15, shown in FIG. 2, is used according to the present invention to pass the belt buckles 9 and 10 through the slit 4.

FIG. 2 shows in dash-dotted lines the two belt holders 6 and 7 with the belt buckles 9 and 10. Each of the belt buckles 9 and 10 has a release button 16 and 17, by means of which a buckled safety belt can be released. The mounting aid 15 according to the present invention is simultaneously provided for both belt buckles 9 and 10. It has the shape of a wedge widening toward the belt buckles 9 and 10 and is in the form of a hollow body, consisting of two wedge surfaces 18 and 19 and two wedge-shaped sides 20 and 21. An oblong hole 22 and 23 is provided in the wedge surfaces 18 and 19, through which said hole one can reach with a finger to depress the release buttons 16 and 17. Both sides 20 and 21 have a tongue 24 and 25 directed downward as seen in the drawing and designed as a belt tongue 12 and 13. Therefore tongues 24 and 25 can be engaged in the belt buckles 9 and 10, so that the mounting aid 15 is held in this manner on the belt buckles.

It is also important that the mounting aid 15 has a vertex line 26, which is at right angles to the belt buckles 6 and 7 and therefore parallel to the slit 4 to make passing through especially easy.

The solitary belt buckle 8 can usually be passed through the seat 1 without a special mounting aid. It would, of course, be possible to use a mounting aid provided for only one belt buckle for this purpose, which would correspond to the mounting aid 15. It is also possible to use two individual mounting aids instead of one common mounting aid 15 for the two belt buckles 9 and 10.

During the mounting of the seat 1, the mounting aid 15 is inserted into the belt buckles 9 and 10, after which the seat 1 is moved toward the vehicle chassis. Due to the wedge-shaped design of the mounting aid 15, the belt buckles 9 and 10 pass through the slit 4 by themselves. If necessary, the mounting aid 15 can be gently pulled after the mounting of the seat to completely remove the belt buckles 9 and 10 from the slit 4, which can easily be done by means of the holes 22 and 23. Then, one finger is inserted into one of the holes 22 and 23, and the release buttons 16 and 17 are depressed, so that the mounting aid 15 can be pulled out of the belt buckles 9 and 10 and the mounting can thereby be completed.

The embodiments of the invention in which an exclusive property or privilege is claimed are defined as follows:

1. Mounting aid for facilitating the passing through of belt buckles through slits in a rear seat of a motor vehicle, characterized in that it consists of a wedge tapering toward the seat, wherein the thicker end of the said wedge has a tongue for engaging in a belt buckle, which said tongue corresponds to an ordinary belt tongue.

2. Mounting aid in accordance with claim 1, characterized in that the vertex line of the wedge is at right angles to the principal extension plane of the tongue.

3. Mounting aid in accordance with claim 1, characterized in that it has two mutually parallel tongues for engaging in two belt buckles arranged adjacent to each other.

4. Mounting aid in accordance with claim 1, characterized in that it is designed as a hollow body and has at least one hole for inserting a finger for operating the buckle to disengage the tongue of the mounting aid.

5. Mounting aid in accordance with claim 4, characterized in that the hole is provided in one of the two wedge surfaces of the mounting aid.

6. Mounting aid in accordance with one or several of the above claim 5, characterized in that a hole is provided in both wedge surfaces.

7. The process for mounting a rear seat of a motor vehicle provided with slits for passing through belt buckles, characterized in that a mounting aid tapering in the shape of a wedge toward the seat is placed on the belt buckles as a means facilitating the passing through.

8. Process in accordance with claim 7, characterized in that a common mounting aid, which can be engaged in each of the belt buckles with a tongue, is used for two belt buckles arranged immediately next to each other.

* * * * *